Aug. 19, 1958 P. V. WYSONG, JR., ET AL 2,848,009
UNLOADING VALVE
Filed Feb. 16, 1956 2 Sheets-Sheet 1

INVENTORS
Paul V. Wysong, Jr. &
BY Robert P. Rohde
S. C. Thorpe
ATTORNEY

2,848,009

UNLOADING VALVE

Paul V. Wysong, Jr., and Robert P. Rohde, Saginaw, Mich., assignors to General Motors Corporation, Detroit, Mich., a corporation of Delaware Application February 16, 1956, Serial No. 565,834

3 Claims. (Cl. 137—108)

This invention relates to a pressure regulating valve and in its most particular aspect concerns a valve adapted for inclusion in a hydraulic system between a pump and an accumulator to cause idling of the pump when the accumulator pressure has reached a selected value and to cause recharging of the accumulator by the pump when the pressure in the accumulator has become reduced to a predetermined extent. Such valves are usually called "unloading valves," but are sometimes referred to as "charging valves."

A complaint common to many of the valves of this type which are presently available derives from their tendency to "hunt" or dither, a condition precluding proper operation thereof. Also, in many cases, the clearance between the valve parts must by necessity be made so small that deposits of even fine particles of dirt cause malfunctioning of the valve.

The present invention has as its principal object to provide an unloading valve which is free of the faults just indicated.

A further object is to provide such a valve which is not adversely affected by temperature changes.

Another object is to provide a valve which is substantially unaffected by variation in flow rates.

A still further object of the invention is to supply a valve of the above category which is simple in construction and inexpensive to manufacture.

Other objects and features of the invention will become apparent from the subsequent description going to a preferred embodiment thereof. The description will proceed with reference to the accompanying drawings in which, Figure 1 shows a reservoir and pump assembly in section, the unloading valve being built into a portion of the pump confined by the reservoir; and Figure 2 is an enlarged longitudinal section of the unloading valve and associated pilot valve.

Figure 1:
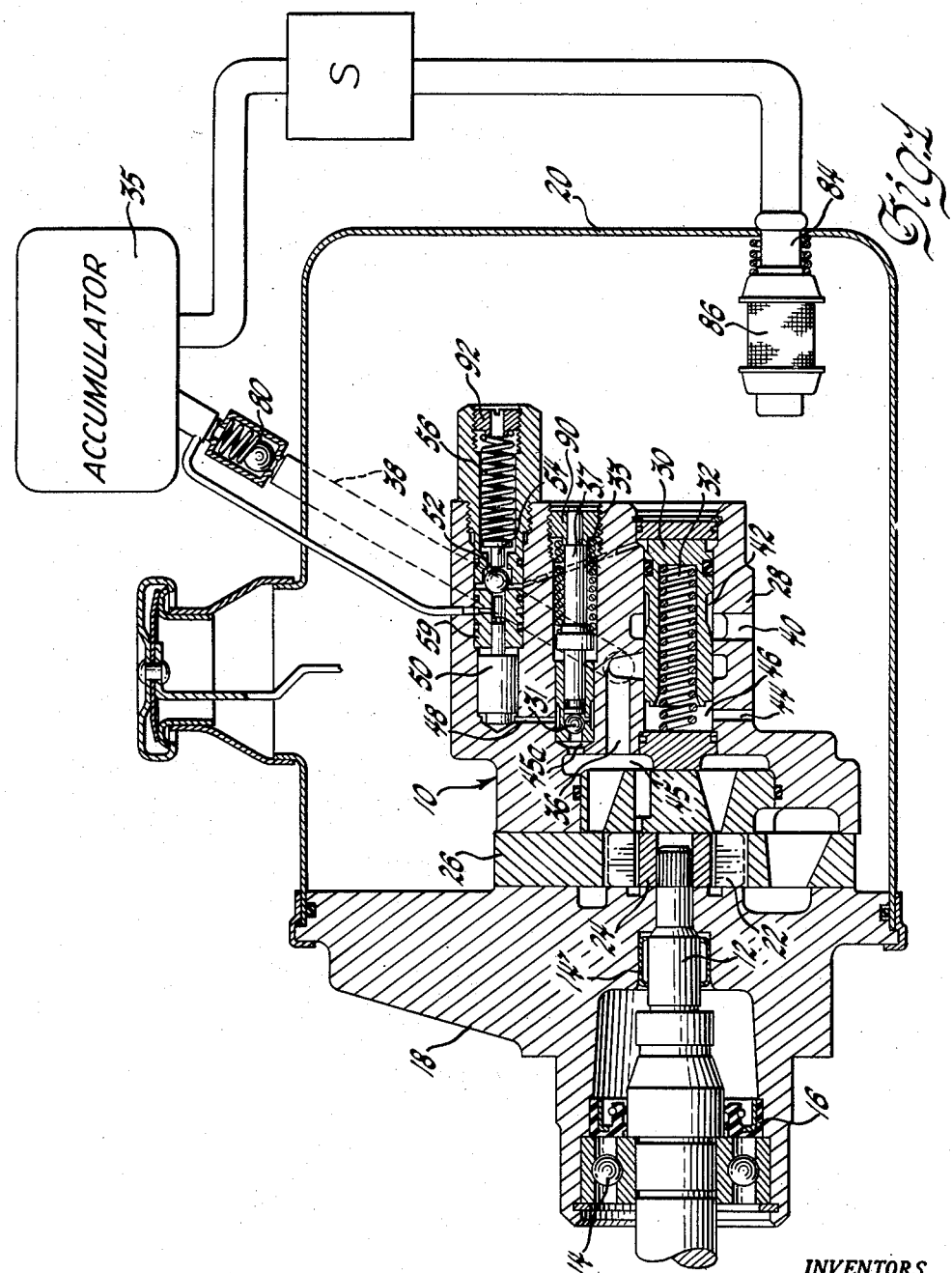
Figure 2:
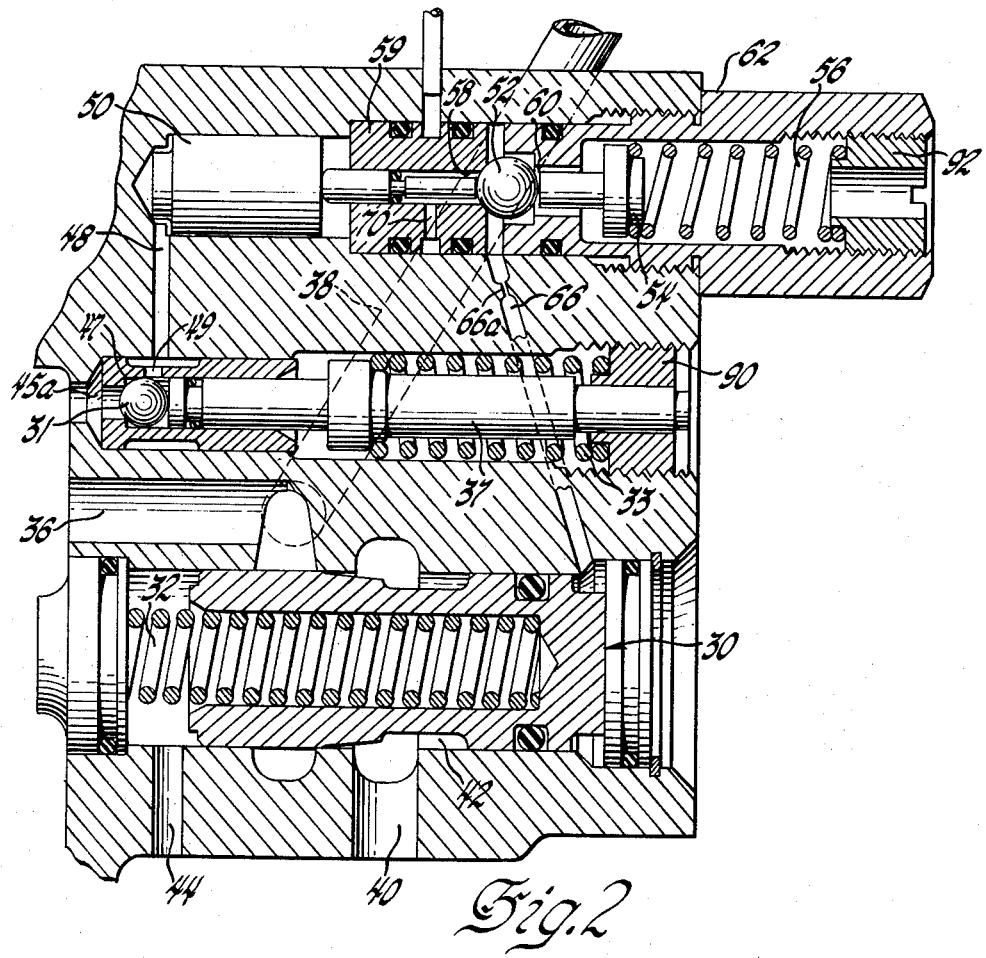

Referring first to Figure 1, the numeral 10 generally indicates a vane pump which may generally correspond in structure and operation to the pump shown in U. S. Patents 2,544,987 and 2,544,988 to Gardner et al. Suffice it to say here, that the pump is driven through a drive shaft 12 turning in bearings 14, 14' and surrounded by an oil seal 16, both the bearing assemblies and the seal being shouldered into the pump body 18. The body member 18 closes one end of a reservoir 20 from which the pump draws. Pumping action is provided by vanes 22 carried by rotor 24 and radially reciprocated by a suitably internally contoured cam ring 26.

Within the pump cover 28 is a by-pass valve 30 loaded by a spring 32 tending to maintain the valve in the position shown, this being the position of the valve during charging of the accumulator 35. Charging of the accumulator is effected through passages 36 and 38 of which the latter is shown out of its true position for simplicity of presentation.

As can readily be seen, leftward movement of the valve 30 against the resistance of the spring 32 will result in interconnection of the passage 36 and passageway 40 which empties to the enveloping reservoir. Fluid following the indicated course flows around the annular channel 42 formed in the valve 30.

In addition to the passage 40 the valve cover 28 is drilled to provide a bleed passage 44 for any fluid which may collect through leakage in the chamber 46.

A passage 48 in the pump cover 28 terminates behind a plunger 50 forming part of the unloading device or valve conforming to the invention. A ball 31 loaded by a spring 33 through a plunger 37 will be seen as blocking passage of fluid from the pump discharge chamber 45 to passage 48. Sleeve 47 providing the seat for the ball 31 is apertured at 49 (Fig. 2) so as to permit flow of fluid to passage 48 when the ball is off its seat.

The unloading device includes in addition to plunger 50, a ball 52 disposed between the plunger and a second plunger 54, the latter being loaded by a spring 56 so that the ball is normally urged to a position over an opening 58 serving as a seat for the ball. An opening 60 in the member 62 confining the plunger 54 and the associated spring 56 provides a second seat for the ball 52, such opening or seat being of larger diameter than the opening 58 for a purpose which will later appear.

The chamber in which the ball 52 is confined is formed by member 62 and guide 59 for the stem of plunger 50. This chamber opens to a passage 66, terminating at the bore accommodating the valve 30 and having a restriction at 66a.

A radial passage 70 in guide 59 will be seen as connecting to the accumulator charging line 38 downstream of check valve 80. The connecting passage in the pump cover as well as the line to the accumulator is shown diagrammatically for simplicity of presentation. The check valve 80 (Fig. 1) in line 38 prevents back flow from the accumulator after the same has been brought up to pressure, as will be later understood.

Before describing the operation of the particular system, it might be noted that the same was developed with special regard to its use in an automotive vehicle. Thus, in the contemplated application the pump 10 is driven as from the crankshaft of the engine of the vehicle, the drive being conveniently by belt and pulley. With such a drive, the pump is in constant operation so long as the engine is running.

The various accessories supplied with pressure fluid by the accumulator 35 are collectively indicated in Fig. 1 by the letter "S." Included among these accessories may be, for example, a power steering mechanism, hydraulic brake boosters, hydraulic windshield wipers, hydraulic seat and window adjustors, etc. All of the accessories exhaust to a common return line terminating at the fixture 84 comprising a filter 86 inside the reservoir 20.

Operation

With the parts in the positions shown, the pump discharge line 36 is interconnected with the accumulator charging line 38, while by-pass line 40 is closed by valve 30. Now when the pressure in the accumulator has been built up to the selected maximum value, say 1,050 p. s. i., the pressure at 45a causes displacement of the ball pilot valve 31 so that pressure fluid enters behind the plunger 50 via passage 48 causing displacement thereof to the right. As a consequence, ball 52 is shifted against the resistance of spring 56 from seat 58 to seat 60, and fluid at accumulator pressure is permitted to flow from passage 70 to passage 66 extending to the bore housing valve 30. Accordingly, such valve is displaced leftward against the resistance of spring 32 to interconnect the discharge line 36 and the by-pass line 40.

The loss of pressure behind the plunger 50 due to the by-passing of the pump does not immediately enable the spring 56 to restore the ball 52 to the seat 58, since the accumulator pressure is sufficient to maintain the ball on the seat 60. It is not until the accumulator pressure has become reduced to a predetermined degree that leftward shifting of the ball to the seat 58 occurs.

Restriction 66a performs the important function of momentarily delaying flow of pressure fluid behind the valve 30 and thus assures maintenance of the ball on the seat 60 by accumulator pressure. This pressure is backed up by the seal provided by the plunger 50 which is formed to shoulder into its housing at its left-hand end.

In the construction illustrated, it is important that the relationship between the areas of seat 47 and 58 and the forces of springs 33 and 56 acting thereon produce a pressure unbalance first at ball 31. If this relationship is not maintained, the plunger 50 would be ineffective for its intended purpose and the previously experienced difficulties, indicated in the forepart hereof, would not be overcome.

While the pressure derived through passage 70, i. e. accumulator pressure, is not sufficient to move the ball 52 rightward before such movement is brought about by plunger 50, once the ball is displaced to the seat 60, it is readily held there by accumulator pressure because of the greater area of the ball which becomes available for fluid reaction on the ball reaching seat 60.

Restoration of the ball 52 to the seat 58 occurring by force of spring 56 on reduction of the accumulator pressure to the predetermined or selected value naturally results in loss of pressure behind the by-pass valve 30, which consequently is returned to its position shown by the associated spring 32. Thus begins another accumulator charging cycle.

It should be noted that the accumulator cut-in and cut-out pressures can be changed, if desired, by manipulation of the threaded plugs 90 and 92 to increase the pre-load on the associated springs.

Having thus described and illustrated our invention what we claim is:

1. An unloading device for a hydraulic system including an accumulator and a pump having a by-pass valve associated therewith, said device comprising a casing, a valve element in said casing disposed between a pair of opposed plungers one of which is mechanically resiliently loaded in the direction toward said element, means providing communication between the other plunger and the discharge side of said pump, said other plunger being actuable by the discharge pressure when the same reaches a predetermined value, means inward of said plungers providing a pair of opposed openings serving as seats for said element, the opening nearest said resiliently loaded plunger being larger than the other opening, each plunger having a portion adapted to pass through the adjacent opening to contact said element, and a pair of passages in said casing leading respectively to said accumulator and to said by-pass valve, said passages becoming interconnected on shifting of said element against the resistance of the loading of said resiliently loaded plunger by the said other plunger, said element being maintained in its shifted position by accumulator pressure until such pressure becomes reduced to a predetermined extent.

2. A device according to claim 1 which further comprises a pressure-responsive pilot valve controlling the flow of fluid from the discharge side of said pump to the said other plunger, said pilot valve being displaced when the pump discharge pressure reaches a predetermined value.

3. A device according to claim 2 in which said element is a ball and in which said casing constitutes a portion of the pump housing, said portion confining said pilot valve as well as said ball and said plungers.

References Cited in the file of this patent

UNITED STATES PATENTS

| | | |
|---|---|---|
| 2,316,445 | Marshall | Apr. 13, 1943 |
| 2,372,016 | Rockwell | Mar. 20, 1945 |
| 2,375,411 | Grant | May 8, 1945 |
| 2,474,122 | Schneck | June 21, 1949 |
| 2,474,772 | Ashton | June 28, 1949 |
| 2,584,638 | Staude | Feb. 5, 1952 |
| 2,614,580 | Cormier | Oct. 21, 1952 |